July 1, 1924.    
J. J. DEMERS  
RIM CHAIN CONNECTER  
Filed Dec. 27, 1921  
1,499,913

Inventor:  
Joseph J. Demers  
by Roff P. Hams.  
Attorney

Patented July 1, 1924.

1,499,913

UNITED STATES PATENT OFFICE.

JOSEPH J. DEMERS, OF EAST WATERTOWN, MASSACHUSETTS, ASSIGNOR TO THE COLUMBUS McKINNON CHAIN CO., OF COLUMBUS, OHIO, A CORPORATION OF OHIO.

RIM-CHAIN CONNECTER.

Application filed December 27, 1921. Serial No. 524,820.

*To all whom it may concern:*

Be it known that I, JOSEPH J. DEMERS, a citizen of the United States, residing at East Watertown, in the county of Middlesex and State of Massachusetts, have invented an Improvement in a Rim-Chain Connecter, of which the following description, in connection with the accompanying drawings, is a specification, like characters on the drawings representing like parts.

This invention relates to a chain tightener and connecter that is well adapted for various uses, but is peculiarly well adapted for use upon non-skid tire chains as a rim chain connecter.

In securing non-skid chains upon automobile tires, it is desirable that the rim chains be provided with connecters which are so constructed that they serve to tighten the chains about a tire and to connect the ends of the chains, and since it may be desirable frequently to apply non-skid chains to automobile tires and remove them therefrom, it is important that the rim chain connecters be so constructed that they may be easily and quickly manipulated. It is also important that the connecters be so constructed that they can not become accidentally disengaged while in use.

The primary object of the present invention therefore, is to provide a chain connecter that is simple in construction and which may be readily manipulated to tighten a side chain about a tire and to connect the ends of the chain.

The accompanying drawing illustrates a good practical form of the invention the details of which may be modified within the true scope thereof as defined by the claim.

Figure 1:
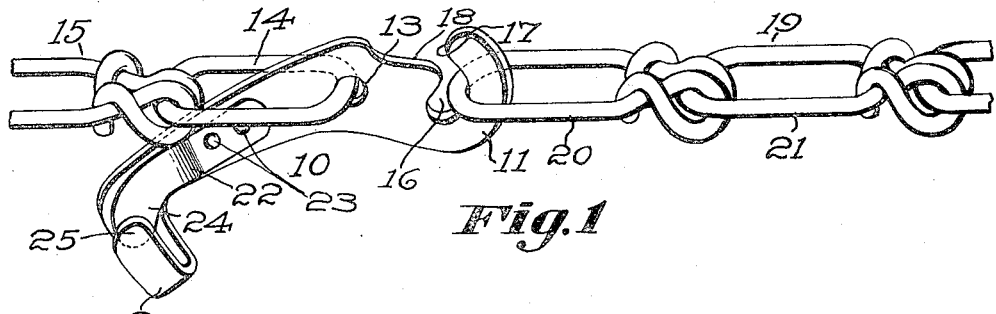
Fig. 1 is a perspective view of the chain fastener shown in the position it assumes in the first step of tightening and connecting the ends of a chain.

In the embodiment of the invention illustrated, the fastener consists of a flattened lever 10 having a chain engaging head 11 at one end and a snap-hook 12 at its other end.

The lever 10 preferably is provided with an aperture 13 located intermediate of its ends, and this aperture is adapted to receive a link 14 or other suitable means for securing the fastener to a chain 15.

The head 11 of the lever preferably is rounded as shown, and has extending inwardly from one side a deep arcuate notch 16 that forms a chain engaging hook at the headed end of the lever. The head 11 preferably is cut away adjacent the mouth of the notch 16 to form the guiding surfaces 17 and 18 which facilitate engagement of the hook formed by the notch 16 with a link of a chain, as will be apparent from Fig. 1.

The snap-hook 12 at the other end of the lever 10 preferably is disposed laterally to the longitudinal axis of the lever and lies to one side of the plane of the flattened lever, the arrangement being such that a line connecting the bottom of the notch 16 and the snap-hook 12 lies to one side of the greater portion of the lever, and to one side of the aperture 13. The construction of the lever 10 is such that it may be readily and inexpensively blanked out of sheet metal, and the snap-hook 12 may be formed by bending a laterally extending portion formed at one end of the lever into a hook.

Figure 2:
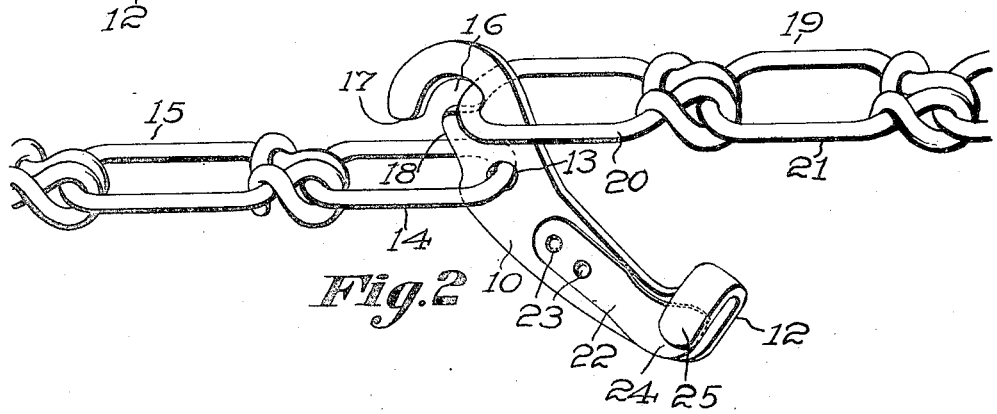
Fig. 2 is a similar view showing the fastener advanced toward the final position.

When it is desired to connect the chain 15 to its other end, or to a different chain 19, the hook at the headed end of the lever 10 is engaged with a link 20 of the chain, and the lever is swung from the position shown in Fig. 1 to that shown in Fig. 2. This movement serves to tighten the chains, and as the snap-hook 12 reaches a link 21 of the chain 19 it enters between the side walls of the link 21 into position to engage one of the sides of the link as will be apparent from Figs. 3 and 4.

It is important that the snap-hook 12 be prevented from becoming accidentally disengaged from the link 21, and to this end the hook is conveniently provided with a spring blade 22 riveted at 23 to the lever 10 and the spring blade has a flexible portion 24 that extends across the entrance to the snap-hook. The outer end of the spring 22 preferably rests against the inner face of the upturned portion 25 of the hook 12 and serves to guide the link 21 past its outer end and into the snap-hook. The snap-hook may be readily disengaged from a link by pressing the flexible portion 24 of the spring inwardly away from the portion 25 of the hook.

Figure 3:
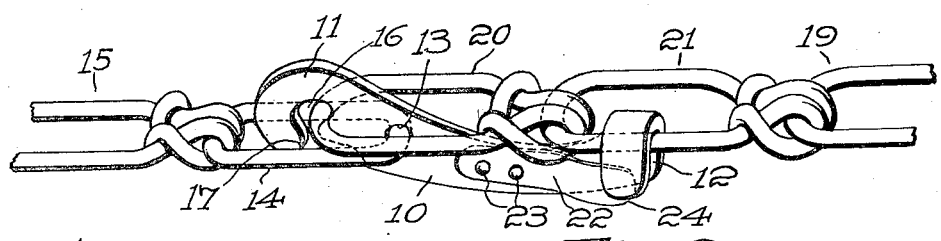
Fig. 3 is a perspective view showing the fastener advanced to its final position and secured in that position.
Figure 4:
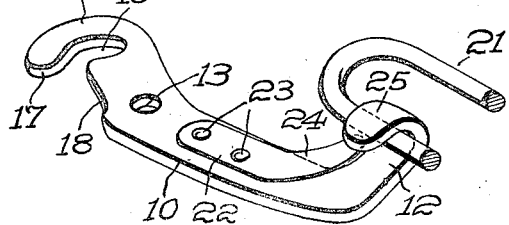
Fig. 4 is a perspective view of the fastener having a link engaged by its snap-hook.

The arcuate construction of the notch 16 serves to direct the link 20 to the bottom of the notch, in which position it is maintained by the tension upon the chains as will be apparent from Fig. 3. The link 20 is also retained in the notch 16 by the construction of the head 11 whereby the portion 17 of the head extends inwardly between the sides of the link 14 as will be apparent from Fig. 3 and as a result of this construction the link 14 prevents the link 20 from escaping from the notch 16.

From the foregoing description when read in connection with the drawing it will be seen that the hook at the end 11 of the lever may be readily engaged with a link of a chain as in Fig. 1, whereupon the lever may be swung to the right to tighten the chains and to move the snap-hook 12 in between the sides of the link 21 where it may be readily engaged with a side of the link, and that while the lever is held in this position the link 20 can not possibly escape from the notch 16 due to the fact that the end 17 extends into the link 14.

I claim—

A chain tightener and fastener, comprising, in combination, a flat sheet metal lever having an intermediate portion pivotally secured to a link of the chain, a head at one end of the lever and having a deep arcuate notch extending inwardly from one side of the head to form a hook engageable with the end link of a chain, guiding surfaces adjacent the entrance to said notch to guide a link of a chain into the notch, a laterally disposed hook at the other end of said lever adapted to engage a side portion of a chain link to hold the lever in the chain fastening position, and with the hook formed by said arcuate notch extending into the link that is pivotally secured to the lever thereby to close the entrance to said notch.

In testimony whereof, I have signed my name to this specification.

JOSEPH J. DEMERS.